(12) United States Patent
Ohrbom et al.

(10) Patent No.: US 7,297,742 B2
(45) Date of Patent: Nov. 20, 2007

(54) LOW VOC WATERBORNE PRIMER WITH HIGH FILM SMOOTHNESS

(75) Inventors: Walter H. Ohrbom, Hartland Township, MI (US); Timothy S. December, Rochester Hills, MI (US); JoAnn Lanza, Farmington Hills, MI (US); Robert D. Weise, Harper Woods, MI (US)

(73) Assignee: BASF Corporation, Southfield, MI (US)

( * ) Notice: Subject to any disclaimer, the term of this patent is extended or adjusted under 35 U.S.C. 154(b) by 279 days.

(21) Appl. No.: 10/843,105

(22) Filed: May 11, 2004

(65) Prior Publication Data

US 2005/0256260 A1  Nov. 17, 2005

(51) Int. Cl.
*C08F 283/00*  (2006.01)
*C08G 18/83*  (2006.01)
*C08J 3/02*  (2006.01)
*C08K 3/20*  (2006.01)
*C08L 75/00*  (2006.01)

(52) U.S. Cl. ............... 524/507; 427/372.2; 427/385.5; 427/388.3; 427/388.4; 427/407.1; 427/416; 428/423.1; 524/539; 524/589; 524/590; 524/591; 524/839; 524/840; 524/457; 525/123; 525/127; 525/455; 525/456

(58) Field of Classification Search ............... 524/507, 524/539, 589, 590, 591, 839, 840, 457; 525/123, 525/127, 455, 456; 428/423.1; 427/372.2, 427/385.5, 388.3, 388.4, 407.1, 416
See application file for complete search history.

(56) References Cited

U.S. PATENT DOCUMENTS 6,437,036 B1 * 8/2002 Gessner et al. ............. 524/457
6,541,594 B2 * 4/2003 Ohrbom et al. ............... 528/45

* cited by examiner

*Primary Examiner*—Patrick Niland

(57) ABSTRACT

An aqueous thermosetting primer composition includes a polyurethane polymer, an acrylic polymer polymerized in a wax having crosslinkable functionality, and a crosslinking component that is reactive with the wax and at least one of the polyurethane polymer and the acrylic polymer. The polyurethane polymer has a glass transition temperature of 0° C. or less. The acrylic polymer has a glass transition temperature that is at least about 20° C. higher than the glass transition temperature of polyurethane resin. The invention further provides a composite coating having as a primer layer a cured layer of the primer composition of the invention and having at least one topcoat layer.

23 Claims, No Drawings

LOW VOC WATERBORNE PRIMER WITH HIGH FILM SMOOTHNESS

FIELD OF THE INVENTION

The present invention relates to aqueous, crosslinkable, primer coating compositions and particularly such primer compositions containing polyurethane and acrylic dispersions. The present invention further relates to composite coating finishes having one or more primer layers and one or more topcoat layers.

BACKGROUND OF THE INVENTION

Coating finishes, particularly exterior coating finishes in the automotive industry, are generally applied in two or more distinct layers. One or more layers of primer coating composition may be applied to the unpainted substrate first, followed by one or more topcoat layers. Each of the layers supplies important properties toward the durability and appearance of the composite coating finish. The primer coating layers may serve a number of purposes. First, the primer coating may be applied in order to promote adhesion between the substrate and the coating. Secondly, the primer coating may be applied in order to improve physical properties of the coating system, such as corrosion resistance or impact strength, especially for improving resistance to gravel chipping. Third, the primer coating may be applied in order to improve the appearance of the coating by providing a smooth layer upon which the topcoat layers may be applied. The topcoat layer or layers contribute other properties, such as color, appearance, and light stabilization.

In the process of finishing the exterior of automobiles today, metal substrates are usually first coated with an electrocoat primer. While the electrocoat primer provides excellent surface adhesion and corrosion protection, it is often desirable to apply a second primer layer. The second primer layer provides additional properties not available from the electrocoat primer. Resistance to gravel chipping is one of the critical properties provided by the second primer layer. The second primer layer may also enhance the corrosion protection of the finish and provide a smoother surface than the electrocoat primer. The second primer also serves to provide a barrier layer between the electrocoat primer layer, which usually contains aromatic moieties and other materials that can cause yellowing on exposure to sunlight, and the topcoat.

Mitsuji et al, U.S. Pat. Nos. 5,281,655, 5,227,422, and 4,948,829, all of which are incorporated herein by reference, disclose automotive basecoat coating compositions containing polyurethane resin emulsion, a second resin emulsion then can be an acrylic resin, and a crosslinking agent. In Mitsuji '829, the polyurethane resin is prepared by dispersing an isocyanate-functional prepolymer and having the water react with the isocyanate groups to chain-extend the prepolymer. The prepolymer is prepared using an aliphatic diisocyanate, a polyether or polyester diol, a low molecular weight polyol, and a dimethylolalkanoic acid. In Mitsuji '655 and '422, the polyurethane resin is prepared by reacting an aliphatic polyisocyanate, a high molecular weight polyol, a dimethylolalkanoic acid, and, optionally, a chain extender or terminator. Because the Mitsuji patents are directed to basecoat-coatings, these patents provide no direction for preparing compositions that have the chip resistance and other properties required for primer coating layers.

Gessner et al., U.S. Pat. No. 6,437,036, incorporated herein by reference, discloses a thermosetting aqueous primer composition that includes a polyurethane polymer, an acrylic polymer, and a crosslinking component that is reactive with at least one of the polyurethane polymer and the acrylic polymer. The polyurethane polymer has a glass transition temperature of 0° C. or less. The acrylic polymer has a glass transition temperature that is at least about 20° C. higher than the glass transition temperature of polyurethane resin. A composite coating has a cured layer of the primer composition and has at least one topcoat layer. This coating composition has a very low volatile organic content (VOC), but it would be desirable to increase the smoothness of the primer layer. While increased smoothness could be obtained by adding an organic solvent to aid flow, the organic solvent would increase VOC. Further, it would be desirable to remove any solvents that are regulated as so-called hazardous air pollutants (HAPs). Unfortunately, effective cosolvents for stabilizing polymer in water, such as glycol ethers, are being regulated as HAPs.

High solids, solventborne primers have been used for decades in the automotive industry. These primers have been formulated for excellent smoothness, but typically have VOC (volatile organic content) values of 400 to 500 grams per liter. Waterborne primers, such as the Gessner primer, have much lower VOC values of 200 grams per liter or less. The waterborne primers have not provided the smoothness that solventborne primers have provided. It would be desirable, therefore, to have a primer composition that provides improved smoothness, which additionally can be formulated with a very low content of volatile organic solvent.

SUMMARY OF THE INVENTION

The present invention provides an aqueous thermosetting primer composition that includes a polyurethane polymer, an acrylic polymer polymerized in a wax having active hydrogen functionality, and a crosslinking component that is reactive with the wax and at least one of the polyurethane polymer and the acrylic polymer. The polyurethane polymer has a glass transition temperature of 0° C. or less. The acrylic polymer has a glass transition temperature that is at least about 20° C. higher than the glass transition temperature of polyurethane resin. "Wax" as used herein refers to a material that is an amorphous solid at about 20° C., is a liquid at a temperature of about 60° C., and has one to three crosslinkable groups, each crosslinkable group separated from the others by at least 10 atoms.

In another embodiment, the aqueous thermosetting primer composition is free of compounds covered by HAPs regulations.

The invention further provides a composite coating having as a primer layer a cured layer of the primer composition of the invention and having at least one topcoat layer. The composite coating has excellent smoothness.

The term "carbamate group" as used in connection with the present invention refers to a group having a structure:

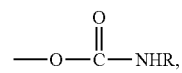

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is referred to herein as a primary carbamate group.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value. As used herein, "emulsion" or "dispersion" will each be used to refer both to dispersions and emulsions.

DETAILED DESCRIPTION OF THE PREFERRED EMBODIMENTS

The following description of the preferred embodiment(s) is merely exemplary in nature and is in no way intended to limit the invention, its application, or uses.

The polyurethane polymer of the invention has a glass transition temperature of about 0° C. or less, preferably about −20° C. or less, and more preferably about −30° C. or less. The glass transition temperature of the polyurethane of the invention is in the range of from about −80° C. to about 0° C., more preferably from about −65° C. to about −10° C., still more preferably from about −65° C. to about −30° C., and even still more preferably from about −60° C. to about −35° C.

The weight average molecular weight of the polyurethane is preferably from about 10,000 to about 60,000, more preferably from about 10,000 to about 30,000.

Polyurethanes are prepared by reaction of at least one polyisocyanate and at least one polyol. The reactants used to prepare the polyurethane are selected and apportioned to provide the desired glass transition temperature. Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate)diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylenebis-4, 4'-isocyanatocyclohexane, 1,6-hexamethylene diisocyanate, 1,12-dodecamethylene diisocyanate, and combinations thereof. It is particularly preferred to use at least one α,ω-alkylene diisocyanate having four or more carbons, preferably 6 or more carbons, in the alkylene group. Combinations of two or more polyisocyanates in which one of the polyisocyanates is 1,6-hexamethylene diisocyanate are especially preferred.

The polyol or polyols used to prepare the polyurethane polymer can be selected from any of the polyols known to be useful in preparing polyurethanes, including, without limitation, 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, trimethylolethane, and glycerin;

polyester polyols such as the reaction products of any of the foregoing alcohols and combinations thereof with one or more polycarboxylic acids selected from malonic acid, maleic acid, succinic acid, glutaric acid adipic acid, azelaic acid, anhydrides thereof, and combinations thereof; polyether polyols, such as polyethylene glycols and polypropylene glycols; and combinations of such polyols. Polyols having two hydroxyl groups are preferred. The polyurethane is preferably prepared using one or more polyester polyols. In a preferred embodiment, the polyester polyol is the reaction product of a mixture that comprises neopentyl glycol and adipic acid.

While it is possible to prepare a nonionic dispersion of the polyurethane, the polyurethane dispersion is preferably anionic. Acid-functional polyurethanes that can be salted to form anionic dispersions or emulsions may be synthesized by including a monomer having acid functionality, such as, without limitation, dialkylpropionic acids including dimethylolpropionic acid, and alkali metal salts of amino acids such as taurine, methyl taurine, 6-amino caproic acid, glycine, sulfanilic acid, diamino benzoic acid, ornithine, lysine and 1:1 adducts of sultones, such as propane sultone or butane sultone, with diamines, such as ethylene diamine, hydrazine, or 1,6-hexamethylene diamine. The hydroxyl groups react to form the urethane linkages while the acid group remains unreacted in the polyurethane polymerization.

Suitable polyurethane polymers can be prepared by any of the known methods. In one method for preparing polyurethane polymers, the polyisocyanate component is reacted with an excess of equivalents of the polyol component to form a hydroxyl-functional polyurethane polymer. Alternatively, an excess of equivalents of the polyisocyanate component can be reacted with the polyol component to form an isocyanate-functional prepolymer. The prepolymer can then be reacted further in different ways. First, the prepolymer can be reacted with a mono-functional alcohol or amine to provide a non-functional polyurethane polymer. Examples of mono-functional alcohols and amines that may be used include polyethylene oxide compounds having one terminal hydroxyl group, lower mono-functional alcohols having up to 12 carbon atoms, amino alcohols such as dimethylethanolamine, and secondary amines such as diethylamine and dimethylamine. Secondly, the prepolymer can be reacted with a polyfunctional polyol, polyamine, or amino alcohol compound to provide reactive hydrogen functionality. Examples of such polyfunctional compounds include, without limitation, the polyols already mentioned above, including triols such as trimethylolpropane; polyamines such as ethylenediamine, butylamine, and propylamine; and amino alcohols, such as diethanolamine. Finally, the prepolymer can be chain extended by the water during emulsification or dispersion of the prepolymer in the aqueous medium. The prepolymer is mixed with the water after or during neutralization.

The polyurethane may be polymerized without solvent. Solvent may be included, however, if necessary, when the polyurethane or prepolymer product is of a high viscosity. If solvent is used, the solvent may be removed, partially or completely, by distillation, preferably after the polyurethane is dispersed in the water. The polyurethane may have nonionic hydrophilic groups, such as polyethylene oxide groups, that serve to stabilize the dispersed polyurethane polymer. In a preferred embodiment, however, the polyurethane polymer is prepared with pendant acid groups as described above, and the acid groups are partially or fully salted with an alkali, such as sodium or potassium, or with a base, such as an amine, before or during dispersion of the polyurethane polymer or prepolymer in water.

The primer composition further includes an acrylic polymer. The acrylic polymer is polymerized in a wax reactive with a crosslinking component of the coating composition. After the acrylic polymer is polymerized in the wax, it is dispersed in an aqueous medium using stabilizing groups present on the acrylic polymer, such as carboxylic acid groups. The acrylic polymer is polymerized from a monomer mixture that preferably includes an active hydrogen-functional monomer and preferably includes an acid-functional monomer. Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Preferably, a sufficient amount of active hydrogen-functional monomer is included to produce an equivalent weight of 1000 or less grams per equivalent, more preferably 800 or less grams per equivalent, and even more preferably 600 or less grams per equivalent.

It is preferred that the acrylic polymer is dispersed as an anionic dispersion. Examples of suitable acid-functional monomers or monomers that become acid-functional with addition of water include, without limitation, α,β-ethylenically unsaturated monocarboxylic acids containing 3 to 5 carbon atoms, α,β-ethylenically unsaturated dicarboxylic acids containing 4 to 6 carbon atoms and the anhydrides and monoesters of these. Examples include, without limitation, acrylic acid, methacrylic acid, crotonic acid, maleic acid or maleic anhydride, itaconic acid or itaconic anhydride, and so on. A sufficient amount of acid-functional monomer is included to produce an acrylic polymer with an equivalent weight of at least 720, preferably at least 1200, and up to about 2000.

In addition to the ethylenically unsaturated monomer having acid functionality or used to generate acid functionality in the finished polymer, one or more other ethylenically unsaturated monomers are employed as comonomers in forming the acrylic resins of the invention. Examples of such copolymerizable monomers include, without limitation, derivatives of α,β-ethylenically unsaturated monocarboxylic acids containing 3 to 5 carbon atoms, including esters, nitriles, or amides of those acids; diesters of α,β-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acids, amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N,-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic anhydrides, monoesters, and diesters. Polyfunctional monomers may also be included to provide a partially crosslinked acrylic dispersion. Examples of polyfunctional compounds include, without limitation, ethylene glycol diacrylate, ethylene glycol dimethacrylate, triethylene glycol diacrylate, tetraethylene glycol dimethacrylate, 1,6-hexanediol diacrylate, divinylbenzene, trimethylolpropane triacrylate, and so on.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone.

After polymerization, the acid functionality is salted, preferably with an alkali or base, preferably an amine. Example of suitable salting materials include, without limitation, ammonia, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, and morpholine. Preferred salting materials include 2-amino-2-methylpropanol and dimethylethanolamine.

The acrylic polymer is polymerized in a wax having one or more crosslinkable groups. The wax is not reactive with functionality on any of the acrylic monomers used to prepare the acrylic polymer. The wax is a solid at about 20° C., but is a liquid at the polymerization temperature. The wax has one to three crosslinkable groups, such as preferably active hydrogen groups, with 10 or more atoms between the crosslinkable groups. The wax may contain other groups that are not crosslinkable during cure of the coating, such as ester, ether, urea, and urethane groups. Preferred reactive waxes include the dicarbamate of dimer fatty acid described in Ohrbom et al., U.S. Patent Application No. 2003/0040580, incorporated herein by reference, the tricarbamate of trimer fatty acid, and diethyloctandiol-dicarbamates and diethyloctandioldiallopanates as described in Rink et al., U.S. Patent Application No. US 2003/0023017, incorporated herein by reference. In another embodiment, the wax is the reaction product of 2 moles of diethyloctandiol and one mole of a linear diisocyanate such as hexamethylene diisocyanate. The wax is preferably the only component of the reaction medium. The wax may be, for example and without limitation, from about 20% to about 80% by weight of the polymerization product of acrylic polymer in wax. It is also possible to include a minor amount of solvent during the polymerization reaction, which may then be removed (i.e., by vacuum distillation) following the polymerization reaction, or may be allowed to remain in the product. For instance, a small amount of solvent may be introduced along with certain commercial free radical initiator products.

The polymerization typically proceeds by free radical polymerization. The free radical source is typically supplied by an organic peroxide or azo compound. Useful initiators include, without limitation, t-butyl hydroperoxide, dilauryl peroxide, t-butyl peroxybenzoate, 2,2'-azobis(isobutyronitrile), and so on. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

The weight average molecular weight of the acrylic polymer is preferably from about 5,000 to about 60,000, more preferably from about 7500 to about 40,000, and even more preferably from about 10,000 to about 30,000. The molecular weight can be determined by gel permeation chromatography using a polystyrene standard or other known methods.

The theoretical glass transition temperature of the acrylic polymer can be adjusted according to methods well-known in the art through selection and apportionment of the comonomers. The acrylic polymer has a glass transition temperature that is at least about 20° C. higher than the glass transition temperature of polyurethane resin. Preferably, the acrylic polymer has a glass transition temperature that is at least about 40° C. higher, more preferably about 50° C. higher, than the glass transition temperature of polyurethane resin. In a preferred embodiment, the theoretical $T_g$ of the acrylic polymer is between about −30° C. and 80° C., more preferably between about −20° C. and 40° C.

The acid-functional acrylic polymer is at least partially neutralized with an amine and then dispersed in water. The reactive wax is dispersed in the water by the salted acrylic polymer.

The polyurethane polymer may be included in the primer in an amount of at least about 10% by weight, preferably at least about 20% by weight, based on the combined nonvolatile weights of the polyurethane polymer and the acrylic polymer. The polyurethane polymer may be included in the primer in an amount of up to about 98% by weight, preferably up to about 80% by weight, based on the combined nonvolatile weights of the polyurethane polymer and the acrylic polymer. It is preferred to include from about 10% by weight to about 75% by weight, and even more preferred to include from about 20% by weight to about 75% by weight, of the polyurethane polymer, based on the combined nonvolatile weights of the polyurethane polymer and the acrylic polymer. Other polymers may be included, for example and without limitation polyesters in amounts, for example, of from about 20% to about 80% by weight, based on the combined weight of all polymers.

The compositions of the present invention also include a crosslinker component. The crosslinker component includes one or more crosslinkers reactive with active hydrogen functionality on the wax and on at least one of the polymers of the composition. Examples of crosslinkers reactive with active hydrogen functionality include, without limitation, materials having active methylol or methylalkoxy groups, including aminoplast resins or phenol/formaldehyde adducts; blocked polyisocyanate curing agents; tris(alkoxy carbonylamino) triazines (available from Cytec Industries under the name TACT); and combinations thereof. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is at least about 2% by weight, more preferably at least about 5% by weight, and up to about 30% by weight, preferably up to about 20% by weight, and particularly preferably up to about 15% by weight of the combined nonvolatile weights of the vehicle portion (film-forming components) of the coating composition. The crosslinker component preferably is from about 2% by weight to about 30% by weight, and more preferably from about 5% by weight to about 20% by weight, and particularly preferably about 5% to about 15% by weight of the combined nonvolatile weights of the vehicle portion (film-forming components) of the coating composition.

The aqueous primer composition may include other reactive components, which may be, for example and without limitation other acrylics, other polyurethanes, other carbamate-functional monomers and polymers, polyesters, vinyl polymers, and so on.

The compositions may include one or more catalysts. The type of catalyst depends upon the particular crosslinker component composition utilized. Useful catalysts include, without limitation, blocked acid catalysts, such as paratoluene sulfonic acid, dodecylbenzene sulfonic acid, and dinonylnaphthylene disulfonic acid blocked with amines; phenyl acid phosphate, monobutyl maleate, and butyl phosphate, hydroxy phosphate ester; Lewis acids, zinc salts, and tin salts, including dibutyl tin dilaurate and dibutyl tin oxide.

The primer coating compositions according to the invention may further include pigments such as are commonly used in the art, including color pigments, corrosion inhibiting pigments, conductive pigments, and filler pigments. Illustrative examples of these are metal oxides, chromates, molybdates, phosphates, and silicates, carbon black, titanium dioxide, sulfates, and silicas.

Other conventional materials, such as dyes, flow control or rheology control agents, and so on may be added to the compositions in desired amounts.

The primer composition has a very low content of volatile of organic solvent. The polyurethane dispersion is preferably prepared as a solvent free or substantially solvent free dispersion. By "substantially solvent free" it is meant that the dispersion has a volatile organic content of less than about 5% by weight of the primer composition. The acrylic dispersion is also preferably solvent free or substantially solvent free dispersion. The primer composition preferably has a volatile organic content of less than about 1.5, more preferably less than about 1.3, and even more preferably less than about 0.7 pounds per gallon, particularly preferably less than about 110 grams per liter. The volatile organic content of a coating composition is typically measured using ASTM D3960.

The primer composition is preferably formulated without using regulated HAPs solvents. Because the wax is used as the medium in the polymerization of the acrylic resin, no cosolvents need be introduced with the acrylic polymer dispersion.

The coating compositions of the present invention can be applied over many different substrates, including wood, metals, glass, cloth, plastic, foam, metals, and elastomers. They are particularly preferred as primers on automotive articles, such as metal or plastic automotive bodies or elastomeric fascia. When the article is a metallic article, it is preferred to have a layer of electrocoat primer before application of the primer coating composition of the invention.

The composite coating of the invention has, as one layer, a primer coating layer that is obtained by reaction of the aqueous primer composition of the invention. The composite coating has a topcoat layer, which may include basecoat coating layer applied over the primer coating layer and an outer, clearcoat layer applied over the basecoat coating layer.

The primer coating composition of the invention is applied directly to the substrate or over one or more other layers of primer, such as the electrocoat primer. The applied primer coating composition is then cured to form a primer coating layer. The electrocoat primer or other first layer of primer may be cured at the same time as the primer coating layer of the invention in a process known as "wet-on-wet" coating. The primer coating layer formed from the primer coating composition of the invention is the outermost primer layer of the composite coating.

A topcoat composition is applied over the primer coating layer and cured to form a topcoat layer. The substrate at that point is then covered with a composite coating that has at least one layer of primer coating derived from the inventive compositions and at least one layer of topcoat. In a preferred embodiment, the coating composition of the present invention is overcoated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions as well as solvent-borne compositions. For example, the topcoat may be a clearcoat according to U.S. Pat. No. 5,474,811, applied wet-on-wet over a layer of a basecoat composition. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne basecoat compositions and/or clearcoat compositions having low volatile organic content are used. The waterborne basecoat and waterborne clearcoat compositions each preferably has a volatile organic content of less than about 1.5, more preferably less than about 1.3, and even more preferably less than about 0.7.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating composition of the invention and the topcoat layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer, which is formed by reacting the primer compositions of the invention, may be cured by reaction of curing component with at least one the polyurethane resin or the acrylic resin before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer of the invention and the topcoat can be applied "wet-on-wet." For example, the primer composition of the invention can be applied, then the applied layer flashed; then the topcoat can be applied and flashed; then the primer and the topcoat can be cured at the same time. Again, the topcoat can include a basecoat layer and a clearcoat layer applied wet-on-wet.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The primer layer of the invention provides improved chip resistance as compared to previously known primers, while retaining the desirable properties of sandability and corrosion resistance. Further, the primer composition of the invention can be formulated to have low volatile organic content and even no volatile organic content. The primer composition preferably is formulated to have a volatile organic content of up to about 120 g/L, more preferably up to about 100 g/L, still more preferably up to about 80 g/L. Preferably, the composition includes no materials subject to HAPS regulations.

Coating layers prepared using the primer composition have excellent smoothness. In general, such coating layers have wavescan values from about 80 to about 100. A composite coating having a primer layer prepared with this primer composition has excellent topcoat layer smoothness.

The invention is further described in the following examples. The examples are merely illustrative and do not in any way limit the scope of the invention as described and claimed.

EXAMPLES

Example 1

Primer Composition and Composite Coating According to the Invention

A suitable reactor equipped with a thermocouple, an add line, and a reflux condenser was charged with 65.8 parts by weight of the dicarbamate of dimer fatty acid diol prepared according to "Preparation of an Additive Component (b)" in U.S. Patent Application Publication No. US 2003/0040580. The contents of the reactor were heated to 140° C. under an inert atmosphere. A mixture of 7.4 parts by weight hydroxyethyl methacrylate, 10.0 parts by weight 2-ethylhexyl methacrylate, 6.6 parts by weight butyl methacrylate, 2.3 parts by weight methacrylic acid, 6.6 parts by weight lauryl methacrylate, and 0.8 parts by weight of a 50% solution of t-butyl peroxyacetate in odorless mineral spirits was added to the reactor through the add line over a period of four hours. The contents of the flask were held at 140° C. for 30 minutes. The reaction mixture was then cooled to 110° C. and 0.5 parts by weight of t-butyl peroxy-2-ethylhexanoate were added over a period of 50 minutes. The contents of the reactor were held at 110° C. for one hour, then heated to 130° C. and poured off. The acrylic product was a hard, waxy solid at room temperature.

The acrylic product, 40.73 parts by weight, was then combined with 17.50 parts by weight hexamethoxymethyl melamine, 1.22 parts by weight dodecylbenzene sulfonic acid, and 2.50 parts by weight of a 20% solution of aminomethylpropanol in water. To this mixture was added 38.09 parts by weight deionized water in six portions to prepare an acrylic dispersion.

An aqueous primer coating composition according to the invention was prepared by combining 112 parts by weight of the prepared acrylic dispersion, 367.8 parts by weight of a white pigment dispersed according to U.S. Pat. No. 5,708,086 (1952.7 parts by weight pigment to 61.4 parts by weight dispersant, 71.2 wt.% nonvolatiles), 14.2 parts by weight of a black pigment dispersed according to U.S. Pat. No. No. 5,708,086 (11.9 parts by weight pigment to 13.0 parts by weight dispersant, 22.9 wt. % nonvolatiles), 183.1 parts by weight XP7110 E (polyurethane dispersion from Bayer Resins, Pittsburgh, Pa.), 273.6 parts by weight of a polyester resin (reaction product of dimer fatty acid, 1,6-hexanediol, ethyl butyl propanediol, isophthalic acid, and trimethylolpropane), and 4 parts by weight of an additive package. The mixture was adjusted with deionized water, about 45.5 parts by weight, to a viscosity of 140 cps @ 384 sec$^{-1}$ on a Brookfield viscometer and adjusted with aminomethylpropanol (20% in deionized water) to a pH of about 8.2. The VOC of the primer composition was 117 g/L.

The aqueous primer coating composition was applied in one layer by spray to electrocoat-primed panels. The ambient application conditions were 75° F. and 75% relative humidity. The applied layer was flashed for five minutes at ambient conditions, then for five minutes at 50° C. The applied coating layer was then cured by baking for 20 minutes in an oven at 150° C. The panels were prepared with cured coating layers from about 25 to about 35 microns thick.

The prepared panels were measured for smoothness in wavescan numbers using BYK Gardner Wavescan-T Model GB4811, available from BYK Gardner USA, Columbia Md. For panels baked in the horizontal position, the aqueous primer of the invention was measured with 109.8 wavescan numbers at 25 microns film thickness and 86.9 wavescan numbers at 35 microns film thickness. In comparison, a commercial aqueous primer composition that had a VOC about 200 g/L was measured with 121.4 wavescan numbers at 33 microns film thickness, and a commercial high solids solventborne primer that had a VOC of about 400 g/L was measure with 83.7 wavescan numbers at 25 microns film thickness.

The invention has been described in detail with reference to preferred embodiments thereof. It should be understood, however, that variations and modifications can be made within the spirit and scope of the invention.

What is claimed is:

1. An aqueous thermosetting primer composition, comprising, in an aqueous medium,
    a dispersed polyurethane polymer having a glass transition temperature of 0° C. or less,
    a dispersed acrylic polymer having a glass transition temperature that is at least about 20° C. higher than the glass transition temperature of polyurethane resin,
    a wax having crosslinkable functionality dispersed with the acrylic polymer, and
    a crosslinking component that is reactive with the wax and at least one of the polyurethane polymer and the acrylic polymer.

2. An aqueous coating composition according to claim 1, wherein the polyurethane polymer has a glass transition temperature of about −20° C. or less.

3. An aqueous coating composition according to claim 1, wherein the polyurethane polymer has a glass transition temperature in the range of from about −80° C. to about 0° C.

4. An aqueous coating composition according to claim 1, wherein the polyurethane polymer has a weight average molecular weight of from about 10,000 to about 30,000.

5. An aqueous coating composition according to claim 1, wherein the polyurethane polymer is present in the aqueous coating composition as an anionic dispersion.

6. An aqueous coating composition according to claim 1, wherein the acrylic polymer has a glass transition temperature that is at least about 40° C. higher than the glass transition temperature of the polyurethane polymer.

7. An aqueous coating composition according to claim 1, wherein the wax has carbamate functionality having a structure

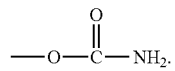

8. An aqueous coating composition according to claim 1, wherein the acrylic polymer has an acid equivalent weight of from about 750 to about 2000.

9. An aqueous coating composition according to claim 1, wherein the polyurethane polymer is from about 40% by weight to about 80% by weight of the combined nonvolatile weights of the polyurethane polymer and the acrylic polymer.

10. An aqueous coating composition according to claim 1, wherein the crosslinking component comprises an aminoplast resin.

11. An aqueous coating composition according to claim 1, having a volatile organic content of less than about 120 grams per liter and being free of volatile organic compounds regulated as HAPs.

12. An aqueous coating composition according to claim 1, wherein the wax comprises one to three active hydrogen groups and has 10 or more atoms between active hydrogen groups.

13. An aqueous coating composition according to claim 1, wherein the wax comprises a member selected from the group consisting of dicarbamate of dimer fatty acid, tricarbamate of trimer fatty acid, diethyloctandiol-dicarbamates, diethyloctanediol diallophanate, and reaction products of 2 moles of diethyloctandiol and one mole of a linear diisocyanate.

14. Method of making a coating compostiion, comprising
polymerizing an acid-functional acrylic polymer in a wax having crosslinkable functionality that is solid at about 20° C. and liquid at the polymerization temperature;
at least partially neutralizing the acid groups of the acrylic polymer and dispersing the wax and neutralized acrylic polymer in water to form an acrylic dispersion;
combining the acrylic dispersion with a dispersed polyurethane polymer having a glass transition temperature of 0° C. or less that is at least about 20° C. lower than the glass transition temperature of the acrylic polymer, at least one pigment, a crosslinking component that is reactive with the wax and at least one of the polyurethane polymer and the acrylic polymer, and, optionally, other materials to form an aqueous primer coating composition.

15. A method according to claim 14, wherein the wax has carbamate functionality having a structure

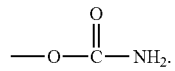

16. A method according to claim 14, wherein the wax comprises one to three active hydrogen groups and has 10 or more atoms between active hydrogen groups.

17. A method according to claim 14, wherein the wax comprises a member selected from the group consisting of dicarbamate of dimer fatty acid, tricarbamate of trimer fatty acid, diethyloctandiol-dicarbamates, diethyloctanediol diallophanate, and reaction products of 2 moles of diethyloctandiol and one mole of a linear diisocyanate.

18. A composite coating, comprising
(a) a substrate;
(b) at least one primer coating layer over said substrate that is obtained by curing an aqueous primer coating composition comprising:
  (i) a dispersed polyurethane polymer having a glass transition temperature of 0° C. or less,
  (ii) an anionic, dispersed acrylic polymer having a glass transition temperature that is at least about 20° C. higher than the glass transition temperature of polyurethane resin,
  (iii) a wax having crosslinkable functionality dispersed with the acrylic polymer, and
  (iv) a crosslinking component that is reactive with the wax and at least one of the polyurethane polymer and the acrylic polymer; and
(c) at least one topcoat layer over said primer coating layer.

19. A composite coating according to claim 18, wherein said topcoat layer comprises an inner basecoat layer and an outer clearcoat layer.

20. A composite coating according to claim 18, wherein said primer coating composition is over a layer of an electrocoat primer.

21. A composite coating according to claim 18, wherein the wax has carbamate functionality having a structure

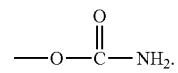

22. A composite coating according to claim 18, wherein the wax comprises one to three active hydrogen groups and has 10 or more atoms between active hydrogen groups.

23. A composite coating according to claim 18, wherein the wax comprises a member selected from the group consisting of dicarbamate of dimer fatty acid, tricarbamate of trimer fatty acid, diethyloctandiol-dicarbamates, diethyloctanediol diallophanate, and reaction products of 2 moles of diethyloctandiol and one mole of a linear diisocyanate.

* * * * *